(12) United States Patent
Lafay et al.

(10) Patent No.: US 10,994,326 B2
(45) Date of Patent: May 4, 2021

(54) COMPOSITIONS AND METHODS OF USE THEREOF IN SANDCASTING

(71) Applicant: Imerys Minerals USA, Inc., Roswell, GA (US)

(72) Inventors: Victor Lafay, Cincinnati, OH (US); Jeremy Tibbs, Morrow, OH (US)

(73) Assignee: Imerys USA, Inc., Roswell, GA (US)

( * ) Notice: Subject to any disclaimer, the term of this patent is extended or adjusted under 35 U.S.C. 154(b) by 89 days.

(21) Appl. No.: 16/085,276

(22) PCT Filed: Mar. 22, 2017

(86) PCT No.: PCT/US2017/023613
§ 371 (c)(1),
(2) Date: Sep. 14, 2018

(87) PCT Pub. No.: WO2017/165536
PCT Pub. Date: Sep. 28, 2017

(65) Prior Publication Data
US 2019/0039120 A1 Feb. 7, 2019

Related U.S. Application Data

(60) Provisional application No. 62/313,445, filed on Mar. 25, 2016.

(51) Int. Cl.
| | | |
|---|---|---|
| *B22C 1/18* | (2006.01) | |
| *B22C 9/02* | (2006.01) | |
| *C04B 33/04* | (2006.01) | |
| *C04B 35/14* | (2006.01) | |
| *C04B 35/63* | (2006.01) | |
| *B22C 9/04* | (2006.01) | |

(52) U.S. Cl.
CPC .............. *B22C 1/181* (2013.01); *B22C 9/043* (2013.01); *C04B 33/04* (2013.01); *C04B 35/14* (2013.01); *C04B 35/6303* (2013.01); *C04B 2235/3201* (2013.01); *C04B 2235/3206* (2013.01); *C04B 2235/3208* (2013.01); *C04B 2235/3232* (2013.01); *C04B 2235/3272* (2013.01); *C04B 2235/349* (2013.01); *C04B 2235/3418* (2013.01); *C04B 2235/72* (2013.01)

(58) Field of Classification Search
CPC .. B22C 1/00; B22C 1/18; B22C 1/181; B22C 9/02; B22C 9/04; B22C 9/043
USPC .......... 164/6, 15, 525, 528; 106/38.2, 38.22, 106/38.27, 38.9
See application file for complete search history.

(56) References Cited

U.S. PATENT DOCUMENTS

| | | | |
|---|---|---|---|
| 4,880,759 A | 11/1989 | Kohut | |
| 5,501,977 A | 3/1996 | Cruze | |
| 5,769,933 A | 6/1998 | Landis | |
| 5,782,951 A | 7/1998 | Aylen et al. | |

FOREIGN PATENT DOCUMENTS

| | | |
|---|---|---|
| CA | 1334722 | 3/1995 |
| CA | 1334772 A | 3/1995 |
| CN | 101508006 B | 12/2010 |
| CN | 101934345 A | 1/2011 |
| EP | 2 921 243 A1 | 9/2015 |
| GB | 534323 | 3/1941 |
| GB | 1 286 815 | 8/1972 |
| KR | 2007/0024079 A | 3/2007 |

OTHER PUBLICATIONS

Supplementary European Search Report for Application No. EP 17 77 1070, dated Jul. 25, 2019.
International Search Report and Written Opinion dated Jul. 7, 2017, in International Application No. PCT/US2017/023613 (10 pgs.).
LaFay et al., "Green Sand Without Seacoal", AFS Transactions, American Foundry Society, 2004, Hill and Griffith Company, pp. 1-11.
LaFay et al., Evaluating Emission Characteristics of Seacoal and Seacoal.
Supplements Using Advanced Analytical Techniques, AFS Transactions, vol. 108; pp. 713-718.
LaFay et al., "Evaluating Benzene Emissions During Casting of Aluminum and Iron", AFS Transactions, vol. 107; pp. 745-750.
LaFay et al., "Carbonaceous Additives and Emission of Benzene During the Metalcasting Process", AFS Transactions, vol. 106; pp. 293-299.
LaFay et al., "Analysis of Residual Characteristics of Carbonaceous Additives", AFS Transactions, vol. 106; pp. 301-303.
Dempsey et al., "Understanding Properties of Carbonaceous Additives and Their Potential to Emit Benzen", AFS Transactions, vol. 105; pp. 109-117.
"Green Sand Additives $3^{rd}$ Edition, Properties, Applications, and Effects of Misuse, Including Indicative Test Results", AFS and the Institute; pp. 6-9.
Sanders, "Foundry Sand Practice, Sixth Edition", Ball Clay, American Colloid Company, Skokie, Illinois, 1973, pp. 547-605.
Sanders, "Foundry Sand Practice, Sixth Edition", Lignite, American Colloid Company, Skokie, Illinois, 1973, p. 668.
Lafay, "Successfully Bonded Bentonite Sands: What Have We Learned in the Last 25 Years," American Foundry Society, pp. 349-360 (2011).

*Primary Examiner* — Kevin P Kerns

(74) *Attorney, Agent, or Firm* — Finnegan, Henderson, Farabow, Garrett & Dunner, LLP

(57) ABSTRACT

Compositions useful for foundry processes such as green sandcasting are discussed. The compositions may include ball clay, bentonite, and a carbonaceous material. The ball clay may include leonardite and/or causticized lignite, e.g., as a portion of the natural ball clay deposit. The composition may further include sand, such that the resulting mixture may be formed into a green sand mold for use in casting molded articles. Incorporation of ball clay materials in the compositions may help to improve the quality of the casted article.

18 Claims, No Drawings

COMPOSITIONS AND METHODS OF USE THEREOF IN SANDCASTING

CLAIM FOR PRIORITY

This application is a U.S. national phase entry of International Application No. PCT US2017/023613, filed Mar. 22, 2017, which claims the benefit of priority of U.S. Provisional Application No. 62/313,445, filed Mar. 25, 2016, to both of which this application claims the benefit of priority, and the entirety of the subject matter of both of which is incorporated herein by reference.

FIELD OF DISCLOSURE

Embodiments of the present disclosure relate generally to compositions useful for forming sand molds and methods of use thereof, e.g., in sandcasting.

BACKGROUND

Casting is a foundry process for preparing articles in which a heated liquid material, often a metal or metal alloy, is poured into the cavity of a mold and allowed to cool in the shape of the cavity. The casted article is then released from the mold. Various materials can be used to form the mold, e.g., depending on the nature of the material to be cast. Sand casting, for example, is useful for casting metals and metal alloys. In this process, sand is typically combined with a binding agent and formed into the desired mold shape. Forming such sand molds can be done by compacting the sand mixture around a pattern (e.g., a replica of the article to be cast) and removing the pattern to leave a cavity with the desired shape and configuration. Once molten metal is introduced into the mold and cooled to solidify, the casted metal article may be released, often by breaking down the sand mold.

Green sand casting refers to the use of wet or moistened sand to form the mold, wherein sand is typically combined with water and a binding agent such as clay to form the molding medium. The binding agent generally allows the sand particles to cohere, such that the mold can maintain its shape and withstand stress applied throughout the casting process. During green sand casting, the sand mold typically retains some amount of moisture, with clay serving as an adhesive at both ambient and elevated temperatures. Binder mixtures are sometimes provided as a "pre-mix," which can be combined with a local source of sand to produce the molding medium.

The chemical composition of the sand mold generally dictates its properties, including its ability to withstand the stress and pressure of the casting process, which in turn, affects the quality of the cast article. Different compositions of sand molding medium can have a significant impact on the ability of the mold to perform under the high temperature, compression conditions during sand casting.

SUMMARY OF THE DISCLOSURE

The present disclosure includes compositions useful in sandcasting, including green sandcasting, preparation of such compositions, and methods of use thereof. The compositions herein include, e.g., binder compositions and green sand compositions that may be used to prepare a sand mold for casting.

For example, the present disclosure includes a binder composition comprising ball day, bentonite, and a carbonaceous material. The ball day may comprise, e.g., from about 15% to about 35% alumina by weight with respect to the total weight of the ball clay and/or from about 30% to about 60% silica by weight with respect to the total weight of the ball day. According to some aspects, the ball clay may comprise leonardite. In some aspects, the ball clay may have a loss on ignition (LOI) ranging from about 12% to about 50%. The ball clay of the composition may comprise a first ball clay material and a second ball clay material different from the first ball clay material. For example, the composition may comprise a first ball clay material having a loss on ignition (LOI) greater than about 9% and less than or equal to 12%, and a second ball clay material having an LOI greater than 12% and less than about 60%.

According to some aspects of the present disclosure, the carbonaceous material may comprise sea coal and/or leonardite. The leonardite may be obtained from a natural ball clay deposit and/or may be added in addition to leonardite that may be present in the natural ball clay deposit. For example, the ball clay may comprise a first portion of leonardite or causticized lignite from a natural deposit of ball clay material, and the carbonaceous material may comprise a second portion of leonardite. In some aspects, the composition may comprise from about 1% to about 70% bentonite by weight with respect to the total weight of the composition. The bentonite may comprise, e.g., sodium bentonite, calcium bentonite, or a combination thereof. As a further example, in some aspects of the present disclosure, the composition comprises from about 10% to about 40% ball clay by weight and from about 30% to about 60% bentonite by weight with respect to the total weight of the composition, and wherein the ball clay comprises from about 1% to about 10% of leonardite or causticized lignite.

The present disclosure also includes methods of sand casting, wherein an exemplary method comprises preparing a mixture by combining ball clay, bentonite, a carbonaceous material, and sand; and preparing a mold by forming the mixture into a shape. The ball clay, bentonite, and carbonaceous material may include any of the features of the compositions mentioned above. For example, the ball clay of the mixture may comprise leonardite or causticized lignite. According to some aspects, the ball clay, the bentonite, and the carbonaceous material comprise a binder composition, and preparing the mixture includes adding the binder composition to the sand. For example, the binder composition to be combined with the sand may comprise from about 5% to about 20% by weight with respect to the total weight of the mixture.

The mixture may additionally comprise water, providing for a moisture content ranging from about 1.8% to about 2.2% by weight with respect to the total weight of the mixture. For example, the mixture may be a green sand composition suitable for forming a sand mold. Forming the mixture into the shape mentioned above may include forming the mixture around a pattern, and removing the pattern to leave a cavity, e.g., which may receive a heated material such as a molten metal or molten metal alloy to form the casted article. For example, the method may further comprise introducing a metal or metal alloy into the mold to form a casted article; and removing the casted article from the mold. According to some aspects, the mixture may have a green compression strength ranging from about 10.0 N/cm$^2$ to about 15 N/cm$^2$. Additionally or alternatively, the mixture may have a hot compression strength ranging from about 300 N/cm$^2$ to about 415 N/cm$^2$ at a temperature between 950° C. and 1100° C.

The present disclosure also includes methods of molding an article, wherein the method may comprise introducing a heated material into a mold, wherein the mold comprises a mixture of ball clay, bentonite, a carbonaceous material, and sand; and allowing the heated material to cool. The ball clay, bentonite, and carbonaceous material may include any of the features of the compositions mentioned above, and the mixture of ball clay, bentonite, carbonaceous material, and sand may include any of the feature of the mixtures described above. According to some aspects, the heated material comprises a molten metal or a molten metal alloy. Additionally or alternatively, the ball clay may comprise leonardite or causticized lignite, and the carbonaceous material may comprise sea coal, leonardite, causticized lignite, or a combination thereof. In some examples of the present disclosure, the mixture has a hot compression strength ranging from about 300 N/cm$^2$ to about 415 N/cm$^2$ at a temperature between 950° C. and 1100° C.

DETAILED DESCRIPTION

Particular aspects of the present disclosure are described in greater detail below. The terms and definitions provided herein control, if in conflict with terms and/or definitions incorporated by reference.

As used herein, the terms "comprises," "comprising," or any other variation thereof are intended to cover a non-exclusive inclusion, such that a process, method, composition, article, or apparatus that comprises a list of elements does not include only those elements, but may include other elements not expressly listed or inherent to such process, method, composition, article, or apparatus. The term "exemplary" is used in the sense of "example" rather than "ideal."

As used herein, the singular forms "a," "an" and "the" include plural reference unless the context dictates otherwise. The terms "approximately" and "about" refer to being nearly the same as a referenced number or value. As used herein, the terms "approximately" and "about" should be understood to encompass ±5% of a specified amount or value.

Compositions according to the present disclosure may comprise one or more clay materials and one or more carbonaceous materials. Such compositions may be useful as a binder in sand casting processes. Clay is a generic term that encompasses a range of hydrous alumina-silicate minerals of varying chemical composition and properties. Dampened clay is generally tenacious and plastic, whereas dried clay becomes hard, particularly when dried at elevated temperatures. Exemplary clay materials suitable for the compositions herein include ball clay, bentonite, fireclay, and combinations thereof. For example, the composition may comprise ball clay, bentonite (e.g., potassium bentonite, sodium bentonite, calcium bentonite, aluminum bentonite, or a combination thereof), and a carbonaceous material.

Ball clay is a sedimentary clay of natural origin that typically comprises about 20%-80% kaolinite, about 10%-25% mica, about 6%-65% quartz, and various other organic and inorganic materials, Ball clay is largely known as a raw material for ceramics manufacturing due to its white color upon firing, Bali clay according to the present disclosure may serve as a binder, e.g., providing plasticity, workability, and/or strength to the molding medium. For example, the plasticity of ball clay may help to maintain the integrity of a sand mold upon the application of forces during sandcasting.

Ball clay materials according to the present disclosure may comprise from about 30% to about 60% silica by weight, such as from about 40% to about 60% by weight, from about 50% to about 60% by weight, or from about 30% to about 40% by weight, with respect to the total weight of the ball clay material. Further, for example, the ball clay materials may comprise from about 15% to about 35% alumina by weight, such as from about 20% to about 35% by weight, from about 25% to about 35% by weight, from about 25% to about 30% by weight, from about 15% to about 25% by weight, or from about 15% to about 20% by weight, with respect to the total weight of the ball clay material. The chemical compositions of several exemplary ball clay materials are provided in Example 1 below, Natural deposits of ball clay may include organic matter or other carbonaceous material. For example, some natural ball clay deposits include leonardite and/or lignite interspersed with the ball clay. Lignite is a combustible brown mineraloid formed from naturally compressed peat and having a carbon content ranging from about 50% to about 75%. Leonardite is an oxidized form of lignite, e.g., comprising humic acids mixed with various minerals such as gypsum and quartz. While organic material can be an undesirable component of raw ball clay deposits for use in the ceramics industry, in some aspects of the present disclosure, the carbonaceous component of the natural ball clay deposit may comprise a portion of the compositions herein.

The loss-on-ignition (LOI) value is the difference in weight of a material before and after heating it at a high temperature ("igniting" the material), in particular the temperatures used during casting. For example, cast iron generally requires a temperature of about 1427° C. (~2600° F.). The LOI provides an indication of the amount of combustible material in the sand mold, e.g., reflecting the amount of organic material that volatilizes and decomposes upon heating. For green sand, the combustible materials contained therein may consume water added to activate the clay binder. LOI measurements therefore can provide useful information about the composition and overall quality of the sand molding medium.

The amount of leonardite and/or lignite of a natural ball clay deposit may vary, e.g., depending on the geographical source of the deposit and/or other factors. LOI values of the ball clay materials in Example 1 provide an indication of their carbonaceous content. As a rough estimate, leonardite may have an LOI ranging from about 60% to about 80%, and causticized lignite may have an LOI that ranges from about 50% to about 70%. Quantifying the LOI of a natural ball clay deposit therefore may be used to estimate the amount of leonardite/lignite material in the deposit.

Natural ball clay deposits useful for the compositions herein may have an LOI greater than about 9% by weight and less than about 65% by weight, such as an LOI greater than 10% and less than 65%, greater than 11% and less than 65%, greater than 12% and less than 65%, greater than 13% and less than 65%, greater than 14% and less than 65%, greater than 15% and less than 65%, greater than 20% and less than 65%, greater than 30% and less than 65%, greater than 35% and less than 65%, greater than 40% and less than 65%, or greater than 45% and less than 65%. In some examples of the present disclosure, the composition may comprise a natural clay deposit having an LOI ranging from about 9% by weight to about 12% by weight, such as an LOI greater than about 9% by weight and less than or equal to 12% by weight. In some examples, the composition may comprise a natural clay deposit having an LOI ranging from about 12% by weight to about 25% by weight, such as an LOI greater than 12% by weight and less than or equal to 20% by weight, or greater than 15% by weight and less than or equal to 18% by weight.

According to some aspects, the compositions herein may comprise two or more different ball clay materials or components, i.e., ball clay materials that have different chemical compositions. For example, the composition may comprise a first ball clay material having an LOI greater than about 9% by weight and less than or equal to 12% by weight, and a second ball clay material having an LOI greater than 12% by weight and less than about 60% by weight. According to some aspects of the present disclosure, the composition may comprise a first ball clay material having an LOI between 9% and 12%, and a second ball clay material having an LOI between 14% and 60%. In yet other aspects, the composition may comprise three ball clay deposits each having a different chemical composition. For example, the composition may comprise a first ball clay material having an LOI greater than about 9% and less than or equal to 12%, a second ball clay material having an LOI greater than 12% and less than or equal to 20%, and a third ball clay material having an LOI greater than 20% and less than about 45%.

Without intending to be bound by theory, it is generally believed that carbonaceous materials may provide several benefits in green sandcasting. For example, carbonaceous material on and immediately adjacent the mold cavity surface may decompose under the heat of the molten metal as it is poured into the mold. A product of this decomposition is elemental carbon (e.g., graphite) at the interface between the mold cavity and molten metal, which can help in releasing the cast article from the mold (e.g., shakeout) and produce a smoother surface on the cast article. Further, for example, carbonaceous material(s) may increase flowability of the molding medium and/or increase the permeability of the mold.

Exemplary carbonaceous materials that may be useful in the compositions herein include, but are not limited to, leonardite, lignite, causticized lignite, bituminous coal such as, e.g., sea coal (a finely-ground type of bituminous coal), Flocarb® (a naturally-occurring organic material produced by Amcol), graphite, lustrous carbon formers (e.g., gilsonite, pitch, organic by-products, polymers), petroleum pitch, and combinations thereof. Causticized lignite may be produced by treating leonardite or lignite with a caustic material, such as sodium carbonate ($Na_2CO_3$) (also known as soda ash) or sodium hydroxide (NaOH) solution (also known as lye or caustic soda). In some examples, leonardite may be treated with soda ash powder to produce causticized lignite. For example, soda ash powder may be added in a concentration ranging from about 5% to about 15%, such as, e.g., about 10%, In other examples, causticized lignite may be produced by treating leonardite with aqueous NaOH solution having a concentration of about 8%, about 9%, about 10%, about 11%, or about 12% NaOH. The causticized lignite may be produced from the lignite component of a natural ball clay deposit as discussed above, e.g., by treating the natural ball clay deposit with a 10% NaOH solution or other caustic solution. In some aspects, the causticized lignite may be produced from a separate portion of lignite, e.g., lignite obtained independently from ball clay or that has been previously removed from a natural ball clay deposit.

Compositions according to the present disclosure may be prepared by adding one or more carbonaceous materials other than the leonardite/lignite present in the natural ball clay deposit. For example, the composition may comprise one or more natural ball clay deposits comprising leonardite and/or lignite and at least one additional carbonaceous material such as sea coal, leonardite (other than that present in the natural ball clay deposit), lignite (other than that present in the natural ball clay deposit), or a combination thereof. In some examples, the carbonaceous component of the natural ball clay deposit may be the only or primary source of carbon in the composition. In other examples, the natural carbonaceous component of the ball clay deposit may be removed prior to combining the ball clay with other components of the composition, or the natural clay deposit may have relatively low carbonaceous content.

Clay materials useful for the compositions herein also include bentonite and fireclay. For example, bentonite may provide plasticity to the composition and may be capable of withstanding the higher temperatures of sand casting without altering its chemical structure. One of the main components of bentonite is montmorillonite, a phyllosilicate clay having a layered structure of an octahedral sheet of alumina between two tetrahedral sheets of silica. The different types of bentonite are named after the dominant compositional element, such as potassium bentonite, sodium bentonite, calcium bentonite, and aluminum bentonite. In some aspects, the composition may comprise sodium bentonite, or a mixture of sodium bentonite and calcium bentonite. In some examples, the composition may comprise a mixture of ball clay, bentonite, and fireclay; or a mixture of ball clay and fireclay.

In some aspects of the present disclosure, the composition may further comprise sand, e.g., such that the mixture of clay, carbonaceous material, and sand may serve as a molding medium. For example, the composition then may be moistened, e.g., to activate the binding properties of the clay, to produce "green sand." Examples of sand that may be used in the compositions and methods herein include, but are not limited to, silica sand (SiO), chromite sand ($FeCr_2O_4$), and zircon sand ($ZrSiO_4$), any of which optionally may include other elements such as magnesium, aluminum, manganese, and/or carbon (graphite). Other types of sand are likewise contemplated and may be used in the compositions herein without departing from the principles of the present disclosure. The composition and gradation of sand may be selected based at least in part on the composition of the material to be cast, the temperature of casting, and/or the availability of sand obtained from a local source. The cohesive strength of the sand molding medium may be most evident in its "green" condition, that is, when it is moistened.

In some examples, a "pre-mix" or binder composition comprising one or more clay materials and one or more carbonaceous materials as discussed above may be prepared and combined with sand and moistened with water to produce the green sand. Alternatively, the green sand may be prepared by combining, in any order, the one or more clay materials, one or more carbonaceous materials, sand, and water. Any of the types and combinations of materials discussed above may be used for the sand molds herein.

Binder compositions according to the present disclosure may comprise from about 1% to about 70% bentonite by weight with respect to the total weight of the binder composition, such as from about 5% to about 70% by weight, from about 30% to about 70% by weight, from about 50% to about 70% by weight, from about 5% to about 50% by weight, from about 30% to about 50% by weight, or from about 45% to about 55% by weight. For example, the binder composition may comprise about 5%, about 25%, about 30%, about 40%, about 50%, about 60%, about 65%, or about 70% bentonite by weight, with respect to the total weight of the binder composition. In some examples, the binder composition may comprise from about 30% to about 60% bentonite by weight and from about 40% to about 10% of ball clay material (which may include carbonaceous material such as leonardite and/or lignite as discussed above) by weight with respect to the total weight of the binder composition. The bentonite may be chosen from sodium bentonite, calcium bentonite, potassium bentonite, aluminum bentonite, and combinations thereof.

An exemplary binder composition according to the present disclosure comprises, by weight, with respect to the total weight of the composition, about 54% sodium bentonite, about 10% calcium bentonite, about 11.5% ball clay material that includes causticized lignite (e.g., the composition comprising about 10% ball clay and about 1.5% causticized lignite), and about 24.5% of carbonaceous material (e.g., including about 22% sea coal and about 2.5% Flocarb®). Another exemplary binder composition comprises, by weight, with respect to the total weight of the composition, about 46% sodium bentonite, about 8% calcium bentonite, about 23% ball clay material that includes causticized lignite (e.g., the composition comprising about 20% ball clay and about 3% causticized lignite), and about 23% of carbonaceous material (e.g., including about 22% sea coal and about 1% Flocarb®). Another exemplary binder composition comprises, by weight, with respect to the total weight of the composition, about 38% sodium bentonite, about 40% ball clay material that includes causticized lignite (e.g., the composition comprising about 36% ball clay and about 4% causticized lignite), and about 22% of carbonaceous material such as sea coal. Yet another exemplary binder composition of the present disclosure comprises, by weight, with respect to the total weight of the composition, from about 50% to about 70% sodium bentonite, from 0% to about 15% calcium bentonite, and from 0% to about 37% ball clay material that includes causticized lignite (e.g., the composition comprising from 0% to about 30% ball clay and from 0% to about 7% causticized lignite). Additional binder compositions are contemplated according to the general principles discussed herein.

Ball clay materials are generally less dense than bentonite. For example, the density of natural ball clay deposits generally ranges from about 23 lbs/ft$^3$ (~370 kg/m$^3$) to about 65 lbs/ft$^3$ (~560 kg/m$^3$), whereas the density of bentonite generally ranges from about 47 lbs/ft$^3$ (~750 kg/m$^3$) to about 65 lbs/ft$^3$ (~1040 kg/m$^3$). Because premix binder compositions are usually purchased by weight but consumed by volume, substituting ball clay materials in place of a portion of the bentonite of a binder composition may have economic benefits with respect to consumption of a pre-mix product.

The green sand compositions according to the present disclosure may Include one or more other materials or additives. Examples of such additives suitable for the green sand compositions herein include, but are not limited to, polymers, surfactants, iron oxide, cellulose (e.g., ground plant products), corn cereal, and starches. The clay material(s), carbonaceous material(s), sand, water, and any other additives of the green sand may be combined or mulled together, e.g., via a muller or using another suitable machine or method for providing a uniform green sand mixture. According to some aspects of the present disclosure, the green sand used as the molding medium may comprise from about 75% to about 95% sand by weight, such as from about 80% to about 90% by weight, or from about 85% to about 90% sand by weight, with respect to the total weight of the green sand. Further, for example, the green sand may comprise from about 5% to about 20% of binder materials (including, e.g., ball clay material(s), bentonite, and carbonaceous materials, including organic additives) by weight, such as from about 8% to about 16%, from about 10% to about 15% by weight, with respect to the total weight of the green sand. The green sand may further comprise water providing for a moisture content ranging from about 1.0% to about 7.0% by weight with respect to the total weight of the green sand, such as from about 1.5% to about 5.0% by weight, from about 1.8% to about 3.5% by weight, from about 1.8% to about 2.5% by weight, from about 1.8% to about 2.2% by weight, or from about 2.0% to about 2.4% by weight, e.g., a moisture content of about 1.8%, about 1.9%, about 2.0%, about 2.1%, about 2.2%, about 2.3%, about 2.4%, or about 2.5% by weight, with respect to the total weight of the green sand.

Methods of preparing or forming a sand mold according to the present disclosure may include use of a pattern or replica of the article to be cast with the mod. The pattern may be formed of plastic, wood, metal, or other suitable material or combination of materials. In some aspects, for example, green sand as discussed above may be shaped around the pattern such that the green sand adopts the shape of the pattern. The pattern then may be removed to form the mold by leaving a cavity in the shape of the pattern. In other aspects, the pattern may be pressed into the green sand and then removed, forming the mold by leaving a cavity in the shape of the pattern. The binders and sand used to form molds may be reused after castings are formed. Recycling the compositions in the molds in this manner may reduce waste from the casting process.

Cores may be inserted into sand molds, allowing the formation of castings with internal voids, holes, reentrant angles, and the like. A core may be formed separately from a mold, then inserted into a mold before casting occurs. A single mold may hold one or more cores. The binders and compositions described in this disclosure may be used to form cores. A core may comprise the same composition as the mold into which it is inserted. It is also possible for a mold and a core to have different compositions.

After being compacted to define a cavity, green sands according to the present disclosure may have sufficient strength to withstand any forces incident to removal of the pattern, such that the cavity design or configuration remains intact. The green sands also may have sufficient strength to withstand the forces incident to moving and positioning the sand mold as it is being formed and/or any hydraulic forces incident to pouring the heated material (e.g., molten metal or metal alloy) into the cavity.

The sand mold may be incorporated into a gating system, or other suitable system or mechanism, for introducing a heated liquid material such as a molten metal or metal alloy into the cavity. The heated liquid material thus may be poured into the mold cavity with the appropriate rate of flow and temperature upon entering the cavity. Exemplary materials that may be used for the casted articles herein include, but are not limited to, iron, aluminum, steel, bronze, brass, magnesium, zinc, and combinations thereof.

The green sand mold may be at least partially dried upon introduction of the heated material into the cavity. The mold may have sufficient permeability to help in preventing damage to the mold upon heating. As the heated material is poured into the mold cavity, air and/or other gases may be displaced through the green sand. Because the green sand is moistened, steam may be generated upon exposure to the heated material, for example. To accommodate the generation of air and/or other gaseous materials generated upon heating, the green sand of the mold may have a suitable permeability that allows the gas to vent with a minimum of gas flow resistance in order to preserve the integrity of the mold. In some aspects, the sand mold may have a relatively high gas permeability.

Permeability may be determined by measuring the flow rate of aft passing through a sample under standard pressure. The standard sample size for testing is generally a cylinder having a diameter of 50.8 mm (2 in.) and a height of 50.8 mm (i.e., a cylindrical sample 2 in. by 2 in.), or a cylinder having a diameter of 50 mm and a height of 50 mm. According to some aspects of the present disclosure, permeability may be determined as the time taken by 2000 cm$^3$ of aft at a pressure of 980 Pa to pass through the sample. A higher permeability value corresponds to a greater capacity to vent gas as the mold is heated. Green sands according to the present disclosure may have a permeability ranging from about 105 to about 120, such as from about 108 to about 116, or from about 110 to about 113.

After pouring the heated liquid material into the mold cavity, the liquid may be allowed to cool such that the cooled material adopts the shape of the cavity. The casted article thus formed may be removed from the sand mold by any suitable method, such as breaking away the sand mold. As mentioned above, the incorporation of carbonaceous materials may assist in removal of the casted article from the sand mold.

Incorporating ball clay materials into the molding medium may improve the quality of the casted article by reducing the number of casting defects or the propensity towards casting defects such as scabs (e.g., irregular crusts on the surface of a casted article), penetration of the casting material into the sand mold, burn on or burn in of sand onto the surface of the casted article, and/or other defects associated with expansion. For example, the green sands of the present disclosure may enhance the integrity of the sand mold while maintaining appropriate properties of green sands.

Various analyses may be used to characterize green sands and green sand molds to assess their capacity to produce casted articles with the appropriate quality. In addition to the flowability and permeability characteristics described above, green sand molds may be described by their green compression strength, green shear strength, dry compression strength, hot compression strength, friability, and cone jolt toughness. The sample size used for these analyses maybe the same standard cylindrical shape mentioned above for permeability analysis (a cylindrical sample having a diameter of 2 in. and a height of 2 in.).

Green compression strength refers to the pressure required to rupture a sample at compressive loading, while green shear strength refers to the force required to shear a sample along its axis. Green sands according to the present disclosure may have a green compression strength ranging from about 5.0 N/cm$^2$ to about 20.0 N/cm$^2$, such as from about 10.0 N/cm$^2$ to about 15.0 N/cm$^2$, or from about 10.5 N/cm$^2$ to about 12.5 N/cm$^2$, and a green shear strength ranging from about 1.0 N/cm$^2$ to about 7.0 N/cm$^2$, such as from about 2.0 N/cm$^2$ to about 5.0 N/cm$^2$, or from about 2.5 N/cm$^2$ to about 3.0 N/cm$^2$.

Drying of a green sand mold may occur relatively quickly in some cases, e.g., while the material for casting is still molten and continues to exert hydraulic forces on the structure of the mold. Dry strength compression provides an indication of the ability of the molding medium to ensure that the mold retains its strength and integrity throughout the entire casting process. Green sands according to the present disclosure may have a dry compression strength ranging from about 30 N/cm$^2$ to about 70 N/cm$^2$, such as from about 40 N/cm$^2$ to about 50 N/cm$^2$, or from about 45 N/cm$^2$ to about 55 N/cm$^2$.

Permeability is relevant to the fact that both the green compression strength and dry compression strength of green sand is proportional to the density of the green sand after it has been compacted to define a mold cavity. In some aspects of the present disclosure, the green sand may have a workability characteristic that facilitates obtaining a relatively high and consistent density of the compacted sand.

Hot compression strength evaluates a green sand sample's performance under elevated temperatures as an indication of the ability of the sand mold to maintain its shape throughout the sandcasting process. Green sands according to the present disclosure may have a hot compression strength that is higher than the hot compression strength of other green sands that do not include ball clay materials (such as, e.g., green sands comprising bentonite as the only clay binder material). Ball clay generally has a higher hot compression strength at elevated temperatures. For example, the green sands disclosed herein may have a hot compression strength ranging from about 300 N/cm$^2$ (~435 psi) to about 415 N/cm$^2$ (~600 psi) when measured at a temperature between 950° C. and 1100° C., such as from about 350 N/cm$^2$ (~508 psi) to about 375 N/cm$^2$ (~544), when measured at a temperature between 950° C. and 1100° C. Hot compression strength may be measured using American Foundry Society procedures (AFS Mold and Core Test handbook).

Wet tensile strength is a useful metric for determining the ability of the sand mold to resist scabbing, or the undesirable formation of projections or roughness on casted articles. During casting, water from the sand adjacent to the molten metal is driven back, creating a condensation zone between the dry and wet sand. The strength of the sand in this layer is considered the wet tensile strength. Higher wet tensile values correspond to less propensity towards scabbing. Green sands according to the present disclosure may have a wet tensile strength ranging from about 0.100 N/cm$^2$ to about 0.600 N/cm$^2$, such as from about 0.150 N/cm$^2$ to about 0.500 N/cm$^2$, from about 0.250 N/cm$^2$ to about 0.350 N/cm$^2$, from about 0.275 N/cm$^2$ to about 0.375 N/cm$^2$, from about 0.300 N/cm$^2$ to about 0.360 N/cm$^2$, or from about 0.325 N/cm$^2$ to about 0.350 N/cm$^2$.

Friability measures the surface brittleness and abrasion resistance of green sand on various surfaces of the sand mold. Higher clay levels generally reduce friability, since loose sand can result in sand inclusion defects on casting surfaces. The compositions herein, e.g., comprising ball clay materials(s) optionally in combination with bentonite, may provide for green sand molds having lower friability relative to those formed from bentonite clays alone. Friability is related to the "brittleness" of a prepared molding sand. The plasticity of ball clay may help to reduce brittleness of a mold prepared from the green sand compositions disclosed herein. Friability is generally inversely related to compactability, where a decrease in compactability or brief air-drying period may result in an increase in friability. Green sands according to the present disclosure may have a friability ranging from about 1% to about 20%, such as from about 3% to about 15%, e.g., from about 6% to about 13%, from about 8% to about 12%, or from about 9% to about 11%.

Cone jolt toughness measures the ability of green sand to absorb energy by repeatedly applying stress to a green sand sample and measuring the point at which the sample splits. Cone jolt toughness generally refers to the integrity of a mold. In a typical test, a green sand sample is automatically picked up and dropped to measure the number of jolts versus displacement of the sample. The test may conclude when the sample splits or measures a vertical displacement of 1.25 mm (0.05 in.). Green sands according to the present disclosure may have a cone jolt toughness ranging from 10 jolts to 50 jolts, such as 15 jolts to 35 jolts, 20 jolts to 32 jolts, or 23 jolts to 26 jolts. Certain additives incorporated into the green sand molding medium may help to increase the cone jolt toughness of the green sand mold. In some aspects of the present disclosure, for example, corn cereal and/or starch may be added to the green sand composition, such that the cone jolt toughness may be greater than 50 jolts.

Other aspects and embodiments of the present disclosure will be apparent to those skilled in the art from consideration of the specification and practice of the embodiments disclosed herein.

EXAMPLES

The following examples are intended to illustrate the present disclosure without, however, being limiting in nature. It is understood that the present disclosure encompasses additional aspects and embodiments consistent with the foregoing description and following examples.

Example 1

Natural ball clay deposits were collected from different locations and their chemical compositions analyzed by powder X-ray diffraction. The LOI values were determined by heating a sample of each deposit to a temperature of 1855° F. (~1010° C.). The composition data are summarized in Table 1. Deposit C was found to have the highest LOI value of the three samples, corresponding to a higher content of leonardite and/or lignite in the natural deposit. Deposit A measured the lowest LOI of the three, but still was found to contain more than 10% of organic or other carbonaceous material.

TABLE 1

Compositions of natural ball clay deposits

|  | Deposit A | Deposit B | Deposit C |
|---|---|---|---|
| $SiO_2$ (%) | 55.26 | 53.24 | 36.25 |
| $Al_2O_3$ (%) | 29.83 | 27.06 | 19.80 |
| $TiO_2$ (%) | 2.54 | 1.80 | 1.14 |
| $Fe_2O_3$ (%) | 0.72 | 1.01 | 0.54 |
| MgO (%) | 0.06 | 0.18 | 0.08 |
| CaO (%) | 0.00 | 0.05 | 0.22 |
| $Na_2O$ (%) | 0.00 | 0.00 | 0.00 |
| $K_2O$ (%) | 0.30 | 0.41 | 0.35 |
| LOI (%) | 11.34 | 16.29 | 41.66 |
| Total | 100.06 | 100.04 | 100.04 |

Example 2

Several binder compositions were prepared according to Table 2 below. Compositions 1 and 2 comprised solely bentonite, compositions 3-5 comprised a mixture of bentonite and the Deposit A ball clay material from Example 1, and composition 6 comprised a mixture of bentonite and a different ball clay material, Deposit D, obtained from a natural deposit. Deposit D was sampled from a layer of ball clay/leonardite blend immediately following a layer of leonardite. The ball clay material of compositions 3 and 5 were treated with a 10% NaOH solution to produce causticized lignite, whereas compositions 4 and 6 were untreated.

TABLE 2

Binder compositions

| Binder composition # | 1 | 2 | 3 | 4 | 5 | 6 |
|---|---|---|---|---|---|---|
| Sodium bentonite (%) | 100 | 70 | 85 | 70 | 70 | 70 |
| Calcium bentonite (%) | — | 30 | — | — | — | — |
| Ball clay deposit A (%) | — | — | 15 | 30 | 30 | — |
| Ball clay deposit D (%) | — | — | — | — | — | 30 |
| Causticized? |  |  | yes | no | yes | no |

Example 3

Green sand compositions 1-6 were prepared with the respective binder compositions 1-6 of Example 2 by combining each binder composition with silica sand in an amount of 7% binder and 93% sand. A standard cylindrical sample having a diameter of 2 in. and a height of 2 in. of each green sand was prepared for comparison of their various casting properties, summarized in Table 3.

Green sand compositions 3-6 comprising ball clay materials were found to have generally higher permeability and hot compression strength as compared to green sand compositions 1 and 2. Green sand compositions 3 and 5 (subjected to caustic treatment) were found to provide lower friability values, suggesting that the green sand molds prepared by causticized green sands may help to reduce casting defects. In Table 3, the squeeze pressure refers to the pressure used to prepare the corresponding 2 in. by 2 in. test specimen.

TABLE 3

Green sand properties

| Green sand composition (binder composition #) | 1 | 2 | 3 | 4 | 5 | 6 |
|---|---|---|---|---|---|---|
| Moisture (%) | 2.2 | 2.4 | 2.4 | 1.96 | 2.18 | 2.2 |
| Compactability (%) | 46 | 46 | 47 | 46 | 47 | 47 |
| Sample (g) | 165 | 165 | 163 | 163 | 165 | 163 |
| Green compression strength ($N/cm^2$) | 14.0 | 13.8 | 12.4 | 10.4 | 10.6 | 12 |
| Permeability | 96 | 108 | 108 | 116 | 113 | 110 |
| Wet tensile strength ($N/cm^2$) | 0.353 | 0.333 | 0.355 | 0.313 | 0.326 | 0.357 |
| Friability (%) | 11.2 | 8 | 8 | 11.8 | 8 | 9.5 |
| Cone jolt toughness (jolt) | 20 | 26 | 25 | 20 | 26 | 32 |
| Green shear strength ($N/cm^2$) | 3.1 | 3.4 | 2.9 | 2.2 | 2.6 | 2.7 |
| Dry compression strength ($N/cm^2$) | 37 | 41 | 58 | 47 | 49 | 60 |
| Hot compression strength (PSI) |  |  |  |  |  |  |
| 1093° C. (~2000° F.) | 201 | 203 | 352 | 514 | 543 |  |
| 982° C. (~1800° F.) | 433 | 480 | 485 | 580 | 467 |  |

TABLE 3-continued

Green sand properties

| Green sand composition (binder composition #) | 1 | 2 | 3 | 4 | 5 | 6 |
|---|---|---|---|---|---|---|
| 816° C. (~1500° F.) | 163 | 202 | 183 | 183 | 186 | |
| 703° C. (~1300° F.) | 126 | 147 | 175 | 147 | 147 | |
| Squeeze pressure (PSI) | | | | | | |
| 155 g | 45 | 50 | 45 | 45 | 40 | 56 |
| 160 g | 75 | 80 | 80 | 80 | 65 | 78 |
| 165 g | 130 | 145 | 140 | 160 | 120 | 160 |

It is intended that the specification and examples be considered as exemplary only, with a true scope and spirit of the present disclosure being indicated by the following claims.

We claim:

1. A binder composition comprising:
   ball clay;
   bentonite; and
   a carbonaceous material;
   wherein the carbonaceous material comprises sea coal and/or leonardite.

2. The composition of claim 1, wherein the ball clay further comprises causticized lignite.

3. The composition of claim 1, wherein the ball clay has a loss on ignition (LOI) ranging from about 12% to about 50%.

4. The composition of claim 1, wherein the ball clay comprises a first ball clay material having a loss on ignition (LOI) greater than about 9% and less than or equal to 12%, and a second ball clay material having an LOI greater than 12% and less than about 60%.

5. The composition of claim 1, wherein the ball clay comprises from about 15% to about 35% alumina by weight with respect to the total weight of the ball clay.

6. The composition of claim 1, wherein the ball clay comprises from about 30% to about 60% silica by weight with respect to the total weight of the ball clay.

7. The composition of claim 1, wherein the ball clay comprises a first portion of leonardite or causticized lignite from a natural deposit of ball clay material, and wherein the carbonaceous material comprises a second portion of leonardite.

8. The composition of claim 1, wherein the composition comprises from about 1% to about 70% bentonite by weight with respect to the total weight of the composition.

9. The composition of claim 1, wherein the composition comprises from about 10% to about 40% ball clay by weight and from about 30% to about 60% bentonite by weight with respect to the total weight of the composition, and wherein the ball clay comprises from about 1% to about 10% of leonardite or causticized lignite.

10. A method of sand casting, the method comprising:
    preparing a mixture by combining ball clay, bentonite, a carbonaceous material, and sand; and
    preparing a mold by forming the mixture into a shape;
    wherein the carbonaceous material comprises sea coal and/or leonardite.

11. The method of claim 10, wherein the ball clay further comprises causticized lignite.

12. The method of claim 10, wherein the ball clay, the bentonite, and the carbonaceous material comprise a binder composition, and preparing the mixture includes adding the binder composition to the sand.

13. The method of claim 12, wherein the binder composition comprises from about 5% to about 20% by weight with respect to the total weight of the mixture.

14. The method of claim 10, wherein the mixture comprises water providing for a moisture content ranging from about 1.5% to about 5.0% by weight with respect to the total weight of the mixture.

15. The method of claim 10, wherein forming the mixture into the shape includes forming the mixture around a pattern, and removing the pattern to leave a cavity.

16. The method of claim 10, wherein the mixture has a green compression strength ranging from about 10.0 $N/cm^2$ to about 15 $N/cm^2$.

17. The method of claim 10, wherein the mixture has a hot compression strength ranging from about 300 $N/cm^2$ to about 415 $N/cm^2$ at a temperature between 950° C. and 1100° C.

18. The method of claim 10, further comprising:
    introducing a metal or metal alloy into the mold to form a casted article; and
    removing the casted article from the mold.

* * * * *